D. GOODWILLIE.
Egg-Carrier.

No. 218,813. Patented Aug. 26, 1879.

ATTEST.
A. G. Morey.
John P. Altgeld.

INVENTOR.
David Goodwillie
Per. G. L. Chapin
Atty.

UNITED STATES PATENT OFFICE.

DAVID GOODWILLIE, OF CHICAGO, ILLINOIS.

IMPROVEMENT IN EGG-CARRIERS.

Specification forming part of Letters Patent No. 218,813, dated August 26, 1879; application filed March 29, 1879.

*To all whom it may concern:*

Be it known that I, DAVID GOODWILLIE, of Chicago, in the county of Cook and State of Illinois, have invented a new and useful Improvement in Egg-Carriers, of which the following is a specification, reference being had to the accompanying drawings, illustrating the improvement and making a part of this description, in which—

Figure 1:
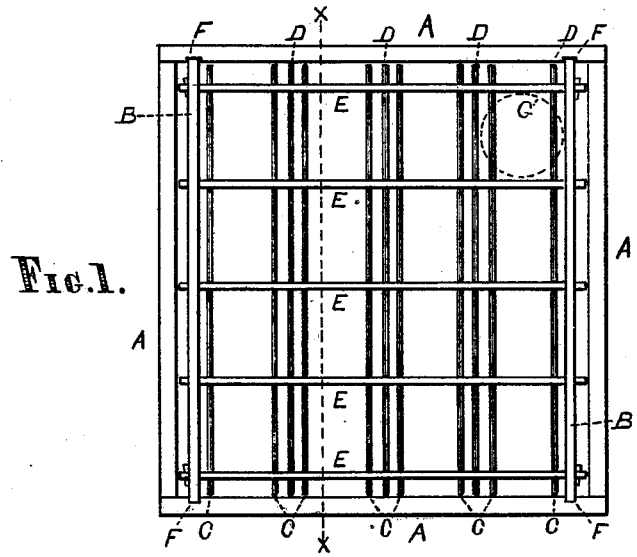
Figure 2:
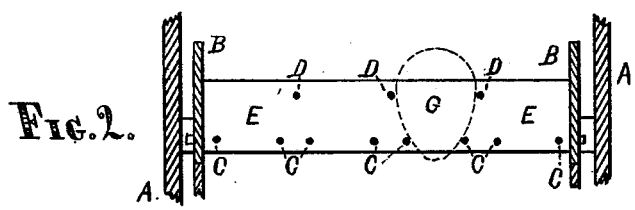
Figure 3:
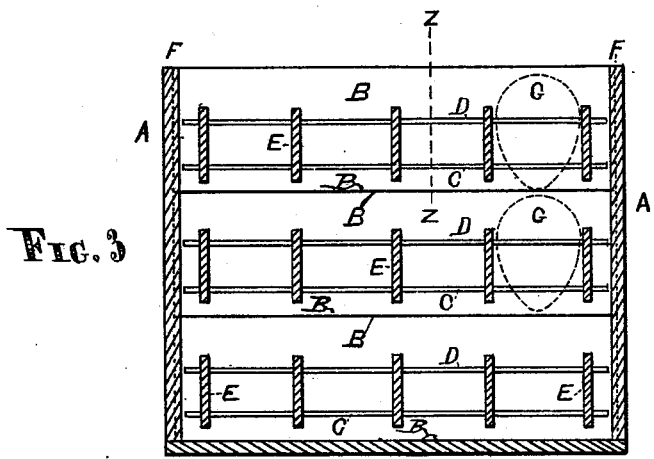

Figure 1 is a plan or top view of one of my improved trays placed in an ordinary shipping-case. Fig. 2 is a vertical broken section taken on line $z$, Fig. 3. Fig. 3 is a sectional elevation taken on line $x\ x$, Fig. 1.

The nature of the present invention consists in one or more trays, (to be placed in a suitable shipping-case,) which are composed of two side and two end pieces, with strips of wood placed transversely in the frame formed by said side and end pieces, and with rattan or other suitable rods placed transversely through the strips, the upper rods being placed such distances apart as to permit eggs to pass between them, and the lower rods placed such distances apart as to let the small ends of the eggs pass partially through, so as to give the eggs bearings on both sides of their apexes, the rods being flexible to prevent breakage.

B represents the side pieces of the trays, which are of wood, and may be of the same width as the transverse strips E if the trays rest on cleats in the shipping-cases containing them; but if the trays are to sit one on top of the other, the side pieces should be wide enough for the eggs in the respective trays to be free from each other. The transverse strips E are at their ends tenoned or otherwise fastened to the side pieces, B, and transversely through the strips E are put rods D D C C, of rattan or other suitable material, to support the eggs.

The rattans are an article of commerce, and may be obtained of proper size, of an eighth of an inch in diameter, for use.

Glue or varnish may be used to fasten the rods in the strips E.

The lower rods are placed nearer together than the upper rods, that proper nests may be formed, so that the apexes of the eggs may pass between them, as shown.

I am aware that partitions of wood and straw-board, to form nests in egg-carriers, have been used before. I therefore confine myself to the use of the rods, and desire to secure by Letters Patent the following:

An egg-carrier consisting of one or more trays, which are composed of two sides and two end pieces, and with transverse strips of wood placed in the frame formed by said side and end pieces, and with rattans or other suitable rods placed transversely through the strips E, the upper rods being placed such a distance apart as to permit eggs to pass between them, and the lower rods placed such a distance apart as to let the eggs pass partially through, so as to give to the eggs bearings on both sides of their apexes, as and for the purpose set forth.

DAVID GOODWILLIE.

Witnesses:
G. L. CHAPIN,
A. G. MOREY.